US007310658B2

(12) United States Patent
Giles et al.

(10) Patent No.: US 7,310,658 B2
(45) Date of Patent: Dec. 18, 2007

(54) METHOD FOR TRACKING RESPONSES TO A FORUM TOPIC

(75) Inventors: Kevin R. Giles, Newton, NH (US); Craig R. Lordan, Pepperell, MA (US); Barbara A. Mathers, Tewksbury, MA (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 10/330,771

(22) Filed: Dec. 27, 2002

(65) Prior Publication Data

US 2004/0128357 A1 Jul. 1, 2004

(51) Int. Cl.
*G06F 15/16* (2006.01)
*G11C 7/00* (2006.01)
*G06F 15/173* (2006.01)

(52) U.S. Cl. .................. 709/206; 365/222; 709/224
(58) Field of Classification Search .............. 709/206, 709/203, 224
See application file for complete search history.

(56) References Cited

U.S. PATENT DOCUMENTS

| | | | |
|---|---|---|---|
| 5,862,330 A | | 1/1999 | Anupam et al. |
| 5,974,446 A | | 10/1999 | Sonnenreich et al. |
| 6,044,205 A | * | 3/2000 | Reed et al. .................. 709/201 |
| 6,052,657 A | | 4/2000 | Yamron et al. |
| 6,167,435 A | * | 12/2000 | Druckenmiller et al. .... 709/206 |
| 2003/0033372 A1 | * | 2/2003 | Shimada ..................... 709/206 |
| 2004/0054967 A1 | * | 3/2004 | Bradenberger ............. 715/511 |
| 2005/0265101 A1 | * | 12/2005 | Nambu et al. .............. 365/222 |

FOREIGN PATENT DOCUMENTS

| JP | 2001222489 | 8/2001 |
|---|---|---|
| JP | 2002108917 | 4/2002 |

OTHER PUBLICATIONS

IBM Technical Disclosure Bulletin, Integrated Document Management System, vol. 36, No. 06A, Jun. 1993, pp. 445-454.
INSPEC: 7221434, A Dynamic Probabilistic Model to Visualise Topic Evolution in Text Streams, Kaban et al., Journal of Intelligent Information Systems: Integrating Artificial Intellifence and Database Technologies, vol. 18, No. 2-3, pp. 107-125, Mar.-May 2002.
Third International Workshop on Advanced Issues of E-Commerce and Web-Based Information Systems, WECWIS 2001, Jun. 21-22, 2001, IEEE Computer Society, Khoo Khyou Bun and Mitsuru Ishizuka, 11 pages.
Kaban et al., Dynamic Probabilistic Model to Visualize Topic Evolution in Text Streams, Mar.-May 2002, pp. 107-125.

* cited by examiner

*Primary Examiner*—Jeffrey Pwu
*Assistant Examiner*—Karen C Tang
(74) *Attorney, Agent, or Firm*—Schmeiser, Olsen & Watts; Eric Damon (57) ABSTRACT

A method of and system for operating an electronic discussion based forum for users. The method comprising: receiving one or more topics for discussion from the users; posting the topics for discussion on the forum; receiving responses to the topics or responses to responses; posting the responses to the topic or the responses to responses on the forum; and providing periodic emails to the users of the forum indicating new responses have been posted.

24 Claims, 8 Drawing Sheets

TRACKING VIEW

| | USERNAME | EMAIL ADDRESS | INTEREST 1 | | | ... | INTEREST K | | |
|---|---|---|---|---|---|---|---|---|---|
| | | | FORUM | TOPIC | LAST NEW RESPONSE DATE | | FORUM | TOPIC | LAST NEW RESPONSE DATE |
| 1 | USERNAME 1 | EMAIL ADDRESS | FORUM | TOPIC | LAST NEW RESPONSE DATE | | FORUM | TOPIC | LAST NEW RESPONSE DATE |
| 2 | USERNAME 2 | EMAIL ADDRESS | FORUM | TOPIC | LAST NEW RESPONSE DATE | | FORUM | TOPIC | LAST NEW RESPONSE DATE |
| 3 | USERNAME 3 | EMAIL ADDRESS | FORUM | TOPIC | LAST NEW RESPONSE DATE | | FORUM | TOPIC | LAST NEW RESPONSE DATE |
| 4 | USERNAME 4 | EMAIL ADDRESS | FORUM | TOPIC | LAST NEW RESPONSE DATE | | FORUM | TOPIC | LAST NEW RESPONSE DATE |
| 5 | USERNAME 5 | EMAIL ADDRESS | FORUM | TOPIC | LAST NEW RESPONSE DATE | | FORUM | TOPIC | LAST NEW RESPONSE DATE |
| 6 | USERNAME 6 | EMAIL ADDRESS | FORUM | TOPIC | LAST NEW RESPONSE DATE | | | | |
| L | USERNAME L | EMAIL ADDRESS | FORUM | TOPIC | LAST NEW RESPONSE DATE | | FORUM | TOPIC | LAST NEW RESPONSE DATE |

METHOD FOR TRACKING RESPONSES TO A FORUM TOPIC

FIELD OF THE INVENTION

The present invention relates to the field of communications between users over the World Wide Web (WWW) or a private network; more specifically, it relates to a method and system for tracking responses posted on forums accessible by users via the WWW or the private network.

BACKGROUND OF THE INVENTION

Computer users can access many resources including user discussion forums over an expansive international network of computer networks known as the Internet (WWW is a graphical sub-network of the Internet) or through private networks. When users access forums, they may post questions or answers to questions asked by other users. Generally, there is a delay of a few hours to a few days or more in a response to a posted question or answer. The forum users must continually return to the forum website (or site in the case of a private network) and search the forum for responses since the user has no way of knowing when or if a response has been posted. This can be a very time consuming process. Often the user forgets to check for many days, so the user then has very many responses to read through.

SUMMARY OF THE INVENTION

A first aspect of the present invention is a method of operating an electronic discussion based forum for users comprising: receiving one or more topics for discussion from the users; posting the topics for discussion on the forum; receiving responses to the topics or responses to responses; posting the responses to the topic or the responses to responses on the forum; and providing periodic emails to the users of the forum indicating new responses have been posted.

A second aspect of the present invention is a system for operating an electronic discussion based forum for users comprising: means for receiving one or more topics for discussion from the users; means for posting the topics for discussion on the forum; means for receiving responses to the topics or responses to responses; means for posting the responses to the topic or the responses to responses on the forum; and means for providing periodic emails to the users of the forum indicating new responses have been posted.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIG. 8 is pictorial representation of an interest selection screen according to the present invention; and.

DETAILED DESCRIPTION OF THE INVENTION

Figure 1:
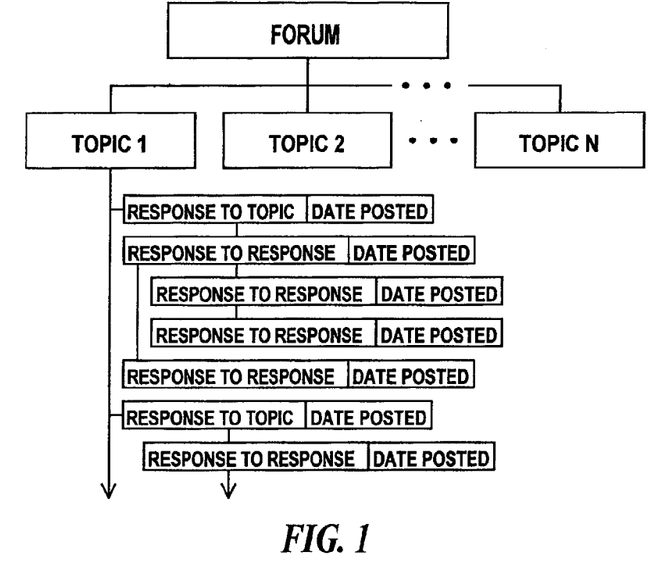
FIG. 1 is pictorial representation of the hierarchical structure of a user forum.

FIG. 1 is pictorial representation of the hierarchical structure of a user forum. In FIG. 1, a forum may include multiple topics and each topic many include many responses. There are two types of responses possible. The first type of response is a response to the topic itself. The second type of response is a response to a previously posted response. Responses to responses may be nested. An exemplary set of responses is illustrated under topic 1. The list of responses for a given topic and their interrelationship is called a thread. For clarity, responses to topics 2 through N are not illustrated. Each response includes a posting date. A posting date includes a date stamp and may include a timestamp as well. A posting date is defined as the date or date and time on which a response to a forum topic or a response to a response is placed on the forum site. The present invention will be described in a WWW/Internet environment. A person of ordinary skill in the art will understand that the invention is applicable to private networks such as local area networks (LAN)s as well.

Figure 2:
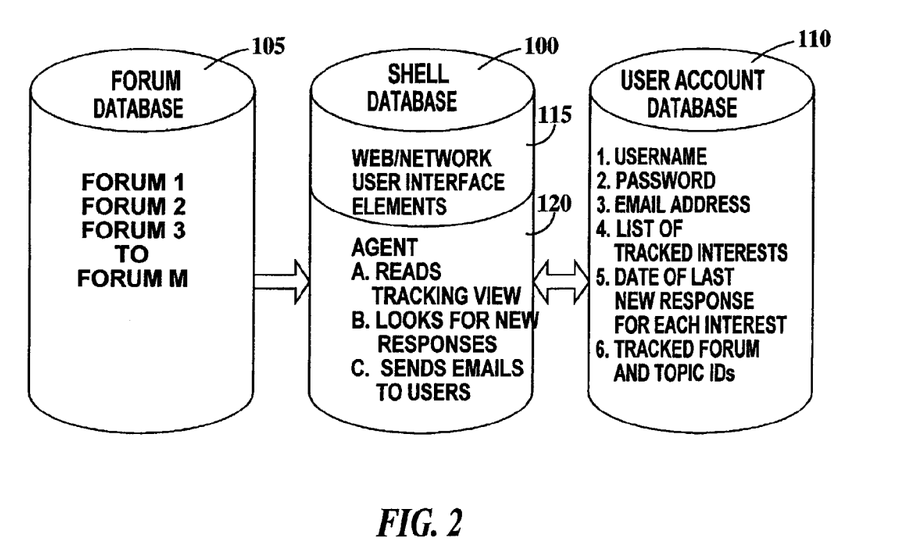
FIG. 2 is pictorial representation of the databases for tracking responses to a forum topic according to the present invention.

FIG. 2 is pictorial representation of the databases for tracking responses to a forum topic according to the present invention. In FIG. 1 a shell database 100 is linked to a forum database 105 and a user account database 110. Shell database 100 includes web interface elements 115, which essentially provide the means for displaying web pages and content. Shell database 100 also includes an agent 120 that assembles periodic tracking emails. Forum database 105 includes the hierarchy of topics and responses as illustrated in FIG. 1 and described supra, for one or more forums. User account database 110 includes usernames, user passwords, user email addresses. User database also includes, for each user, a list of forums and topics (hereafter called interests), a temporal indication of when the last new responses were found for each interest and a cross reference to the actual file IDs of the tracked forums and topics. The temporal indication of the last time there were new responses may be a date that the last periodic email was sent, a date and a time that the last periodic email was sent, a date that agent 120 was last run or a date and a time that agent 120 was last run. The initial value of the temporal indication is the date or the date and time that the interest was enabled for tracking. Hereafter, the temporal indication of the time there were last new responses (i. e. the date that the last periodic email was sent, the date and a time that the last periodic email was sent, the date that agent 120 was last run or the date and a time that agent 120 was last run, will be referred to as the last new response date.

Figure 3:
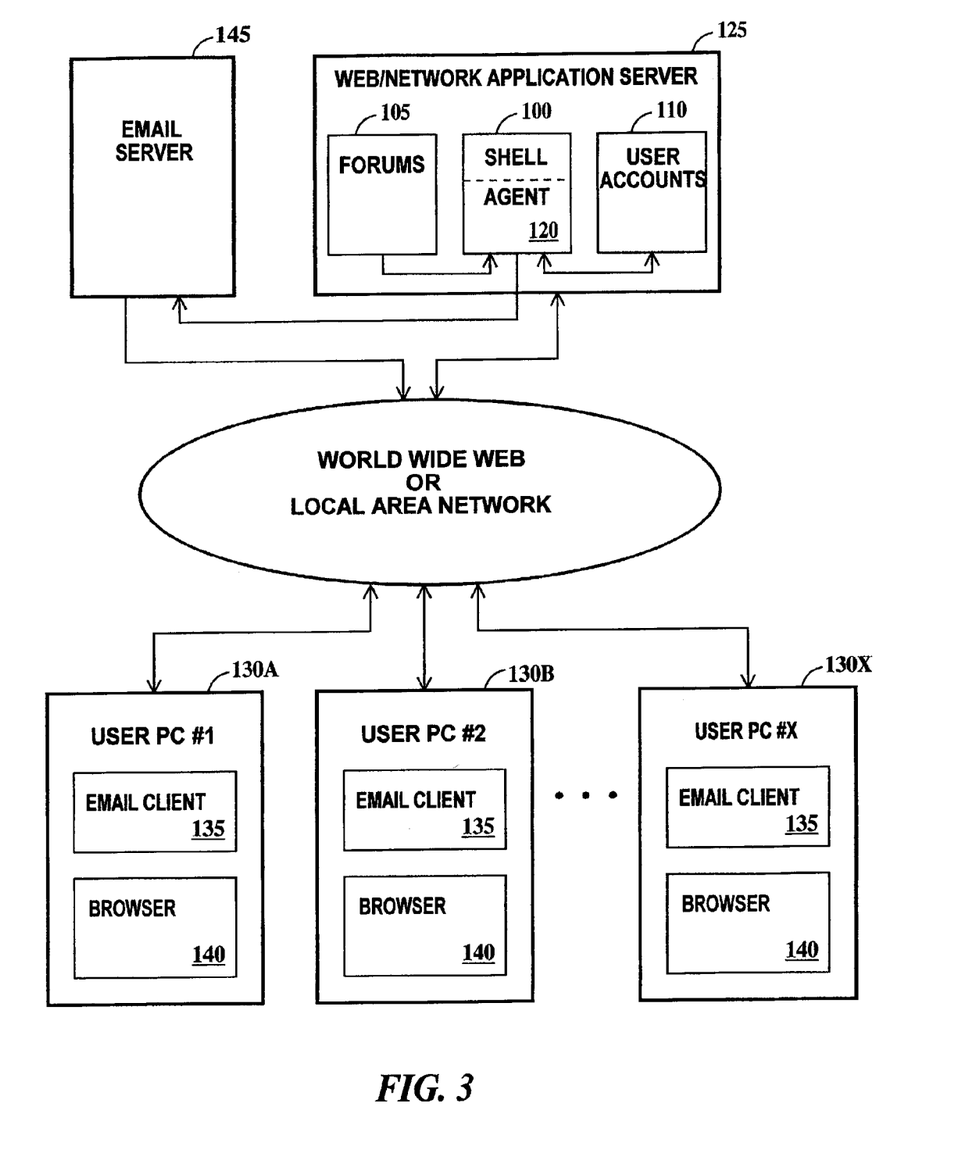
FIG. 3 is a block diagram of a server system for implementing the present invention.

Agent 120 provides three functions. The first function provided by agent 120 is to read a tracking view (illustrated in FIG. 5 and described infra) based on each users interests and the last new response date. Generation of the tracking view is illustrated in FIG. 3 and described infra. The second function provided by agent 120 is to query forum database 105 for new responses. A new response is a response posted after the last new response date for a given interest. The third function of agent 120 is to cause a tracking email to be sent to each user having an interest to which a new response has been posted. After a tracking email is sent, agent 120 replaces the old last new response date with a new last new response date.

Tracking emails are sent only to users having an interest to which a new response to that interest has been posted. The content of a tracking email is either subjects of the responses themselves and a list of universal resource locators (URL) pointing to the qualified responses. It is possible to include the entire response, but doing so requires more server resources than including just the subject and URL of each response.

FIG. 3 is a block diagram of a server system for implementing the present invention. In FIG. 3, shell database 100, forum database 105 and user accounts database 110 are contained in a WEB application server 125. Web application server 125 generates the tracking view, which is stored in user accounts database 110. Web application server 125 links to a multiplicity of user personal computers (PCs) 130A through 130X via the WWW. WWW may be replaced by a LAN. Each PC 130A through 130X includes an email client 135 for receiving email and a browser 140 for linking to Web application server 125 via the WWW. An example of a browser is NETSCAPE™.

Tracking emails are not sent by agent 120, but rather by an email server 145 via WWW under the direction of agent 120. As discussed supra, agent 120 assembles the tracking emails.

Figure 4:
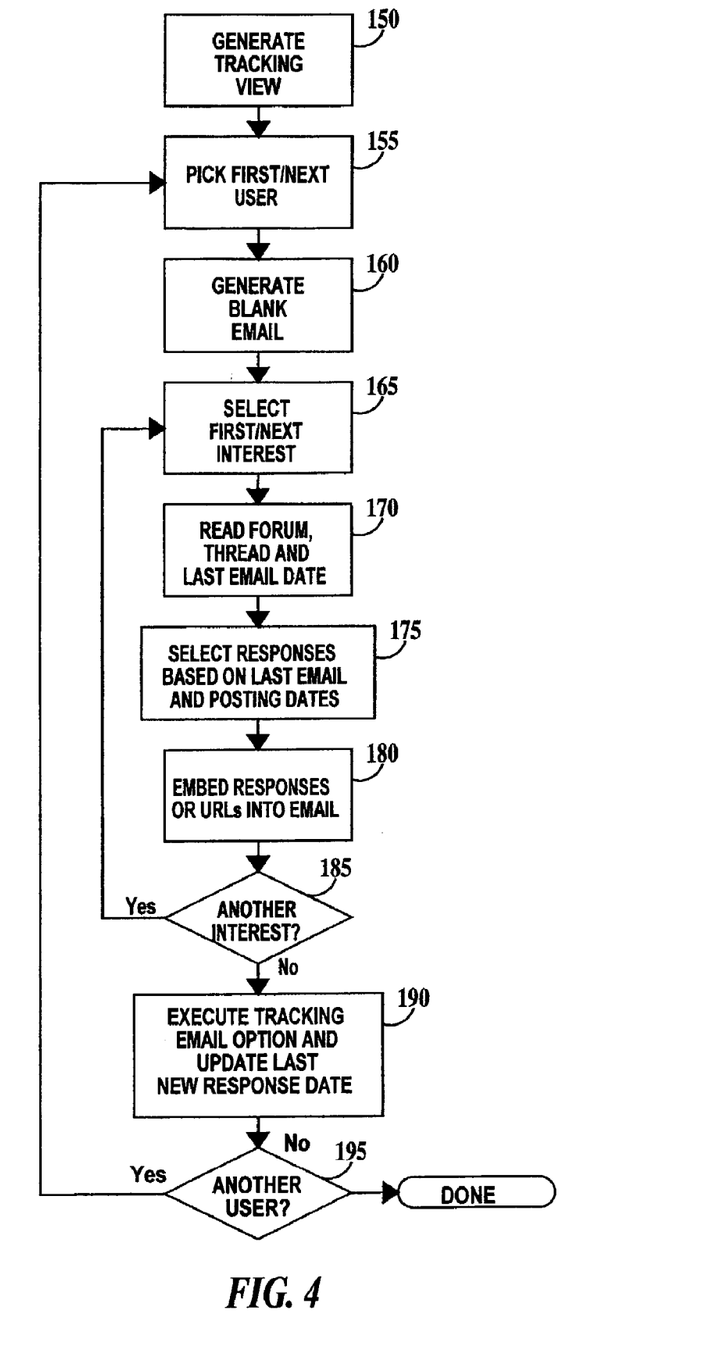
FIG. 4 is a flowchart illustrating the method of the present invention.
Figure 5:
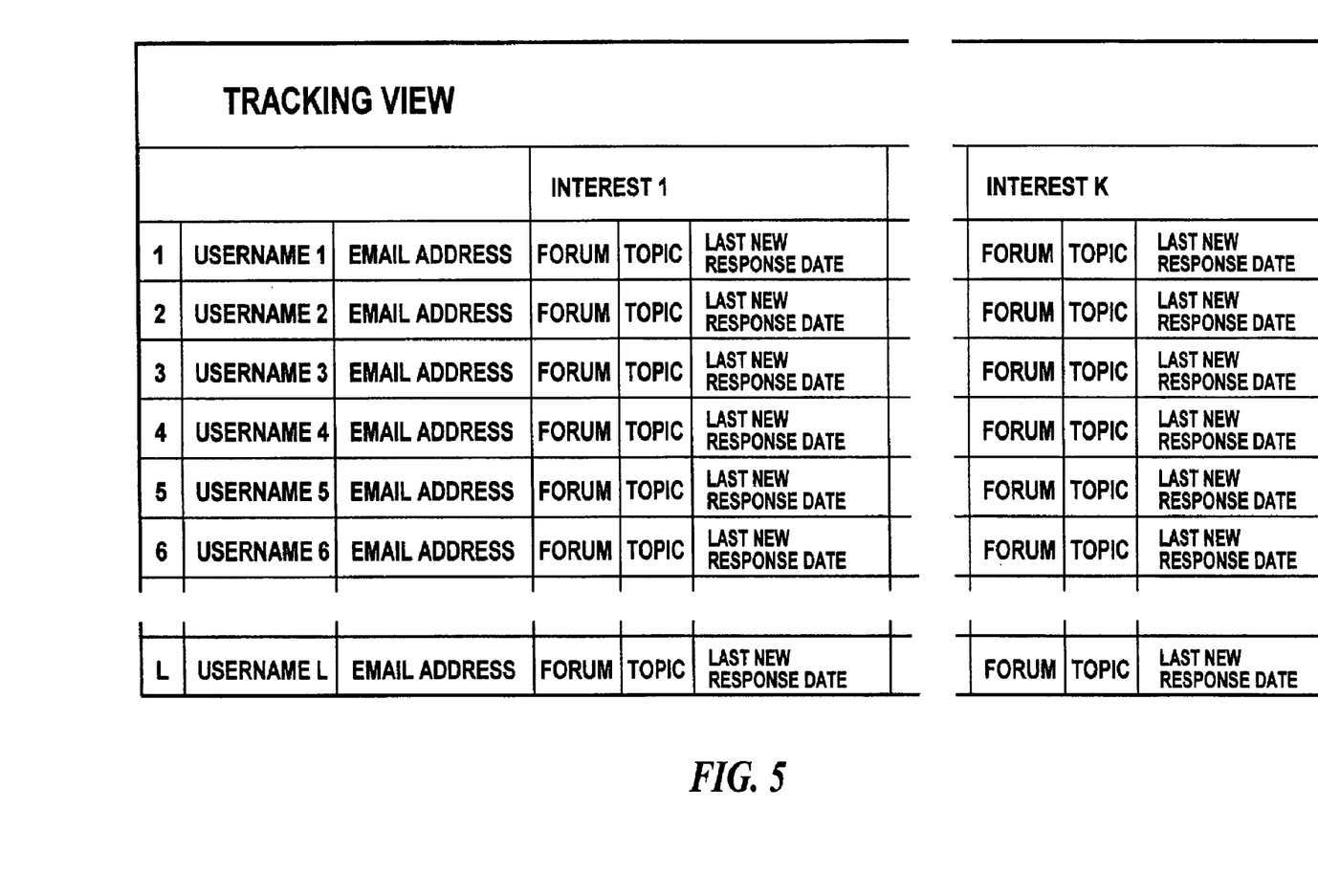
FIG. 5 is pictorial representation of a tracking view according to the present invention.

FIG. 4 is a flowchart illustrating the method of the present invention. In step 150, the tracking view is generated. The tracking view is a list of users having interests that those users have indicated they want tracked. The tracking view is illustrated in FIG. 5 and described infra. User selection of interests and tracking is discussed more fully infra, in reference to FIG. 8. In step 155, the first or next user in the tracking view is selected. In step 160, a blank email to the selected user is generated. In step 165, the first/next interest for the current user is selected. In step 170, the forum and topic of the current interest is queried for a response having a posting date or date and time later the last new response date. In step 175, all new responses are selected. There may be multiple new responses. In step 180, the new responses themselves or URLs to the new responses are embedded in the tracking email. In step 185, it is determined if there is another interest for the current user. If there is another interest for the current user, the method loops to step 165. If all the interests for the current user have been selected then the method proceeds to step 190. In step 190, several tracking email options exist and one or more options are executed. If there are one or more new responses, the email is sent to the current user as a tracking email. If there are no new responses, no tracking email is sent. An optional feature is to send an advisory email that a forum, a topic or one or more responses are archived and not directly available. Also, in step 190, user accounts database 110 (see FIG. 2) is updated to reflect a new date or date and time of the last new responses. In step 195, it is determined if there is another user in the tracking view. If there is another user, the method loops to step 155. If all the users in the tracking view have been selected then the method terminates.

FIG. 5 is pictorial representation of a tracking view according to the present invention. A tracking view may exist in any number of forms dependent upon the software and server environment. A tracking view contains the entire information agent 120 (see FIG. 2) requires. In FIG. 5, the tracking view is organized into rows and columns. There are 1 through L rows, one row for each user. Each user appears only once. The first column of each row contains the username, the second column the user email address. Next are K interest columns subdivided into three sub-columns. The first sub-column identifies a tracked forum, the second sub-column identifies the topic and the third sub-column lists the last new response date. While the number of users may be unlimited or limited only by the physical constraints of the server, the number of tracked interests may be limited to the number K. For example, K may be 20, thus forcing users to manage the number of interests they want tracked to prevent overloading agent 120 (see FIG. 2).

Figure 6:
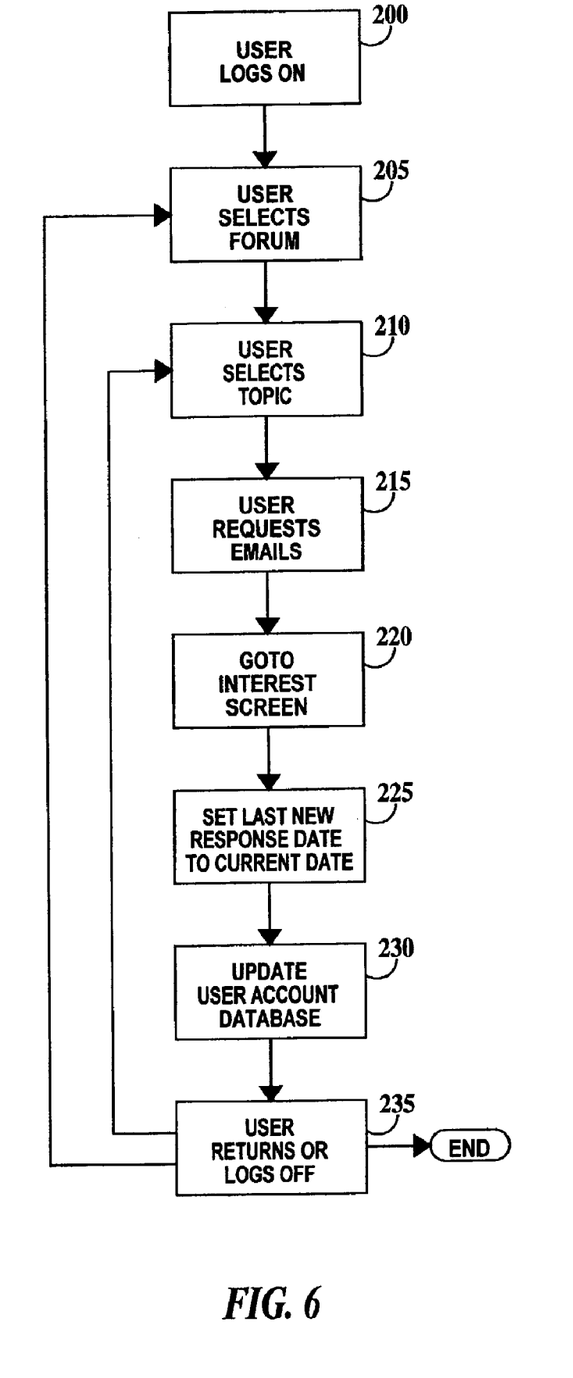
FIG. 6 is a flowchart of a first method for a user to set up response tracking according to the present invention.
Figure 8:
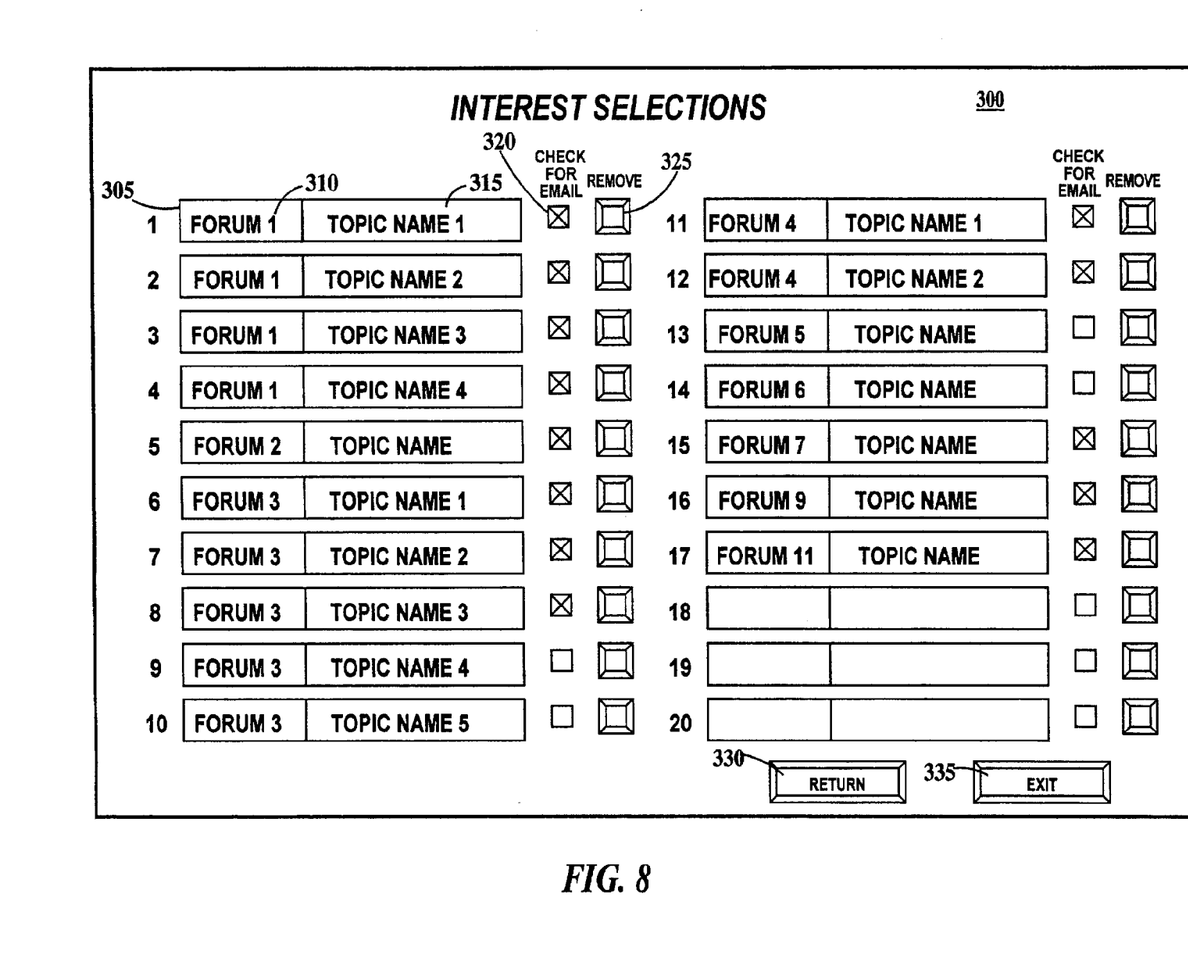

FIG. 6 is a flowchart of a first method for a user to set up response tracking according to the present invention. In step 200, a user logs onto a website. In step 205, the user selects a forum. In step 210, the user selects a topic. In step 215, the user request that the forum/topic be tracked and that tracking emails be sent. In step 220, a screen is displayed on the user's computer showing the user's tracking selections and allowing tracking to be selectively enabled or disabled. This screen is illustrated in FIG. 8 and described infra. In step 225, an initial last new responses date is set to the current date or date and time. In step 230, upon exiting the screen by returning to a forum or topic or exiting the Website, the interests (including forum and topic) and the initial last new response date is stored in user accounts database 110 (see FIG. 2). In step 235, the user either returns to a forum, a topic or logs off. Note that steps 205 through 230 may be repeated as many times as the user goes to new forum and steps 210 through 230 may be repeated as many times as the user goes to new topics.

Figure 7:
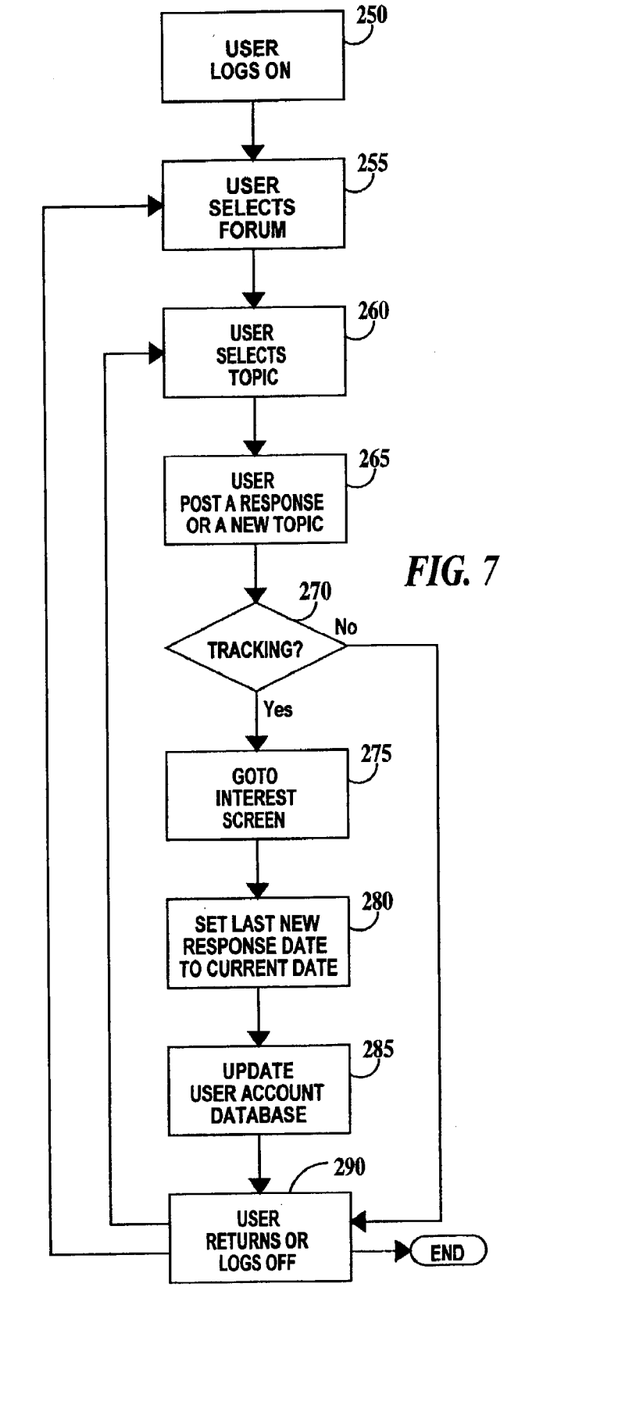
FIG. 7 is a flowchart of a second method for a user to set up response tracking according to the present invention.

FIG. 7 is a flowchart of a second method for a user to set up response tracking according to the present invention. In step 250, a user logs onto a website. In step 255, the user selects a forum. In step 260, the user selects a topic. In step 265, the user posts a response or posts a new topic. In step 270, the user is asked if they want the to track responses to their posting. If the response is "yes" in step 270 then the method proceeds to step 275. In step 275, a screen is displayed on the user's computer showing the user's tracking selections and allowing tracking to be selectively enabled or disabled. This screen is illustrated in FIG. 8 and described infra. Next in step 280, an initial last new responses date is set to the current date or current date and time. In step 285, upon exiting the screen, the interests (including forum and topic) and the initial last new response date is stored in user accounts database 110 (see FIG. 2). In step 290, the user either returns to a forum, a topic or logs off. Note that steps 255 through 290 may be repeated as many times as the user goes to new forum and steps 260 through 290 may be repeated as many times as the user goes to new topics. If the answer is "no" in step 270, the method goes directly to step 290.

FIG. 8 is pictorial representation of an interest selection screen according to the present invention. In FIG. 8, an interest tracking selections screen 300 includes a multiplicity of text display boxes 305. Each text display box 305 includes a first portion 310 for displaying a forum name and a second portion 315 for displaying a topic name for the forum listed in first portion 310 of each text display box 305. In one example, the forum and topic names are generated by web user interface elements 115 of shell database 100 (see FIG. 2) and a cross-reference to the actual forum file ID and topic file ID stored in user accounts database 110 (see FIG. 2). In a second example, the forum name, topic name or both the forum name and topic name are entered or may be overwritten by the user, though a cross-reference to the actual forum file ID and topic file ID are in user accounts database 110 (see FIG. 2).

Interest tracking selections screen 300 also includes a multiplicity of check boxes 320 and buttons 325. When a check box 320 is checked, then tracking emails for the corresponding interest is enabled. Alternatively, check boxes 320 would be replaced by buttons that open the interests and email check boxes would be displayed on individual interest screens. In the present example of FIG. 8, the user has selected only 17 of a maximum of 20 interests and of these 17 only 15 are enabled for actual response tracking (interests 9 and 10 are inactive). An option is to assign a "soft" maximum of 10 interests and then allow an increase to a "hard" maximum of 20 interests when a user requests an eleventh interest to be tracked. Check boxes 320 allow for temporary stopping of tracking emails for a topic. Button 325 allows selection of an interest 305 to be removed when the user no longer wishes to track an interest and permanently wants it removed or if a user has reached the maximum number of interests and wants to replace an older interest with a new interest. Interest tracking selections screen 300 includes a return button 330 and an exit button 335 for navigating the website.

Figure 9:
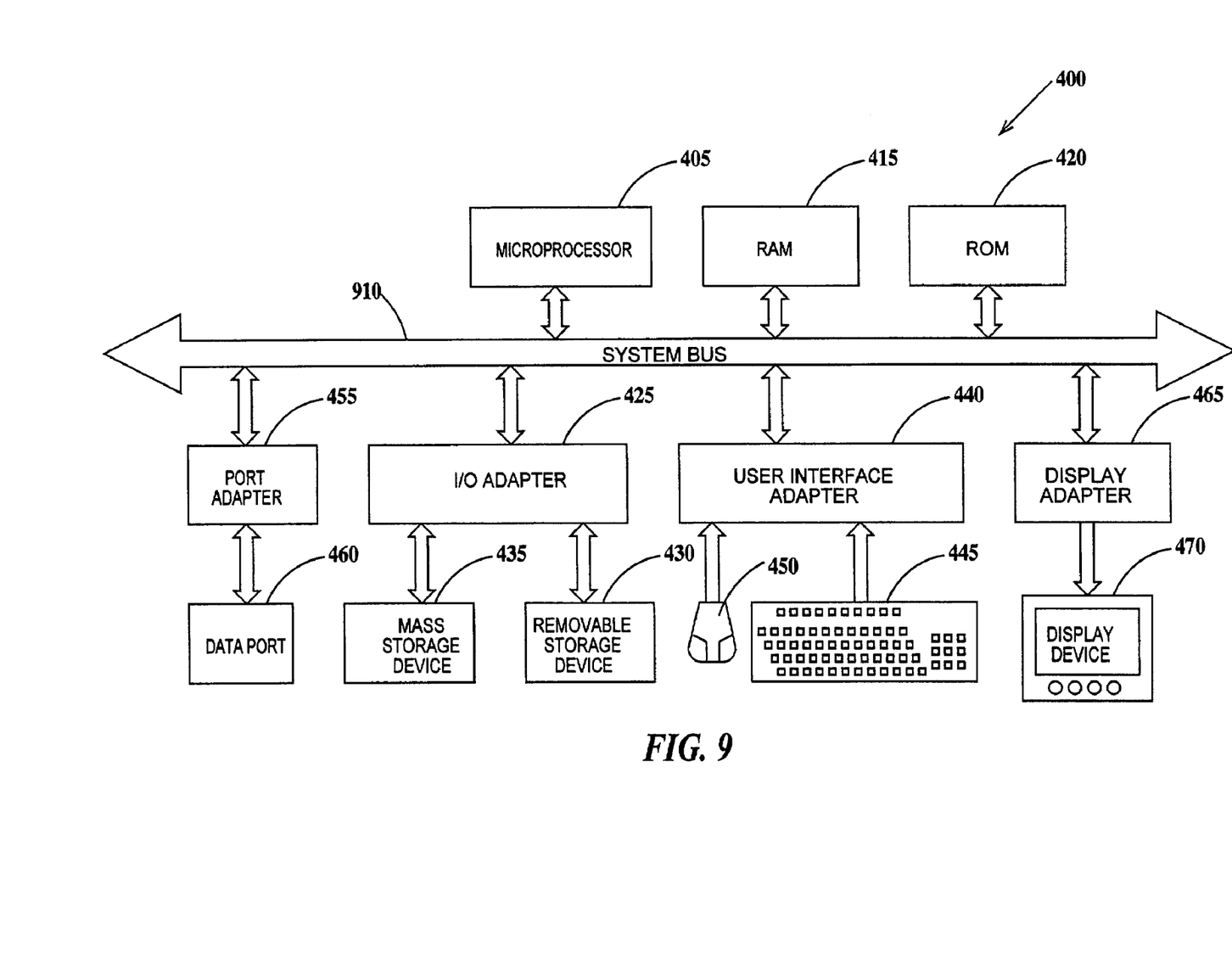
FIG. 9 is a schematic block diagram of a general-purpose computer for practicing the present invention.

Generally, the method described herein with respect to a method for tracking responses to a forum topic is practiced with a general-purpose computer and the method may be coded as a set of instructions on removable or hard media for use by the general-purpose computer. FIG. 9 is a schematic block diagram of a general-purpose computer for practicing the present invention. In FIG. 9, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

In one example, the present invention is implemented in Lotus Notes™. In Lotus Notes™, shell database 100 (see FIG. 2) is the file profile.nsf, user accounts database 110 (see FIG. 2) is the file names.nsf in which agent 120 (see FIG. 2) resides and where the tracking view is stored. In Lotus Notes, interests and tracking options are stored in the file my.notes.net and tracking emails received from MyLDD@notes.net. In Lotus Notes™ a topic is accessed through its Doc UNID and a forum through a Parent UNID. An example of a Lotus Notes™ website is the Lotus Developer Domain web site and an example of a forum within the website is the Notes/Domino 6 Forum.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of operating an electronic discussion based forum for users, comprising:

logging said users onto a website having one or more discussion forums;

allowing said users to select a forum;

receiving topics for discussion on said selected forum from said users;

posting said topics for discussion on said selected forum when said topics are received by said forum;

receiving responses to said topics on said selected forum from said users;

posting said responses to said topics on said forum when said responses are received by said forum;

receiving requests from said users to receive periodic emails (i) when new topics have been posted on said selected forum (ii) when new responses to said selected topic have been posted to said selected topic or (iii) when new topics have been posted on said selected forum and when new responses to said selected topic have been posted to said selected topic, said periodic emails indicating new topics or new responses have been posted on said forum, said periodic emails based on a posting date or a posting date and posting time of said new topics or said new responses;

providing said periodic emails to said users; and generating a tracking view, said tracking view including a list of users who have elected to receive said periodic emails and for each user of said users electing to receive periodic emails, user selected forums and topics to be tracked and a temporal indication of when said new topics, said new responses or both said new topics and said new responses were found, said temporal indication selected from the group consisting of a date that the last periodic email was sent, a date and time that a last periodic email was sent, a date that an agent generating said tracking view was run and a date and time that said agent generating said tracking view was run.

2. The method of claim 1, further including:

determining if new responses exist by comparing said temporal indication in said tracking view to a posting date or posting date and time of responses to said topics or of responses to said responses.

3. The method of claim 1, wherein said new topics, said new responses, or both said new topics and said new responses are posted as soon as received by said forum.

4. The method of claim 1, wherein said periodic emails contain the text of new responses or pointers to new responses on said forum.

5. The method of claim 1, further including:
presenting to each of said users who have elected to receive said periodic emails, a customized interest selection screen, said interest selection screen indicating for each of one or more forums, a forum name, an associated discussion topic and having an associated periodic email selection button.

6. The method of claim 1, wherein said responses include responses to other responses.

7. The method of claim 1, wherein said forum is accessible on the World Wide Web or a local area network.

8. The method of claim 1, wherein said forum is implemented on a LOTUS NOTES™ database.

9. A system for operating an electronic discussion based forum for users comprising:
means for logging said users onto a website having one or more discussion forums;
means for allowing said users to select a forum;
means for receiving topics for discussion on said selected forum from said users;
means for posting said topics for discussion on said selected forum when said topics are received by said forum;
means for receiving responses to said topics on said selected forum from said users;
means for posting said responses to said topics on said forum when said responses are received by said forum;
means for receiving requests from said users to receive periodic emails (i) when new topics have been posted on said selected forum (ii) when new responses to said selected topic have been posted to said selected topic or (iii) when new topics have been posted on said selected forum and when new responses to said selected topic have been posted to said selected topic, said periodic emails indicating new topics or new responses have been posted on said forum, said periodic emails based on a posting date or a posting date and posting time of said new topics or said new responses;
means for providing said periodic emails to said users; and
means for generating a tracking view, said tracking view including a list of users who have elected to receive said periodic emails and for each user of said users electing to receive periodic emails, user selected forums and topics to be tracked and a temporal indication of when said new topics, said new responses or both said new topics and said new responses were found, said temporal indication selected from the group consisting of a date that the last periodic email was sent, a date and time that a last periodic email was sent, a date that an agent generating said tracking view was run and a date and time that said agent generating said tracking view was run.

10. The system of claim 9, further including means:
for comparing said temporal indication in said tracking view to a posting date or posting date and time of responses to said topics or of responses to said responses in order to determine if new responses exist.

11. The system of claim 9, wherein said new topics, said new responses, or both said new topics and said new responses are posted as soon as received by said forum.

12. The system of claim 9, wherein said periodic emails contain the text of new responses or pointers to new responses on said forum.

13. The system of claim 9, further including:
presenting to each of said users who have elected to receive said periodic emails, a customized interest selection screen, said interest selection screen indicating for each of one or more forums, a forum name, an associated discussion topic and having an associated periodic email selection button.

14. The system of claim 9, wherein said responses include responses to other responses.

15. The system of claim 9, wherein said forum is accessible on the World Wide Web or a local area network.

16. The system of claim 9, wherein said forum is implemented on a LOTUS NOTES™ database.

17. A program storage device readable by machine, tangibly embodying a program of instructions executable by the machine to perform method steps for operating an electronic discussion based forum for users, said method steps comprising:
logging said users onto a website having one or more discussion forums;
allowing said users to select a forum;
receiving topics for discussion on said selected forum from said users;
posting said topics for discussion on said selected forum when said topics are received by said forum;
receiving responses to said topics on said selected forum from said users;
posting said responses to said topics on said forum when said responses are received by said forum;
receiving requests from said users to receive periodic emails (i) when new topics have been posted on said selected forum (ii) when new responses to said selected topic have been posted to said selected topic or (iii) when new topics have been posted on said selected forum and when new responses to said selected topic have been posted to said selected topic, said periodic emails indicating new topics or new responses have been posted on said forum, said periodic emails based on a posting date or a posting date and posting time of said new topics or said new responses;
providing said periodic emails to said users; and
generating a tracking view, said tracking view including a list of users who have elected to receive said periodic emails and for each user of said users electing to receive periodic emails, user selected forums and topics to be tracked and a temporal indication of when said new topics, said new responses or both said new topics and said new responses were found, said temporal indication selected from the group consisting of a date that the last periodic email was sent, a date and time that a last periodic email was sent, a date that an agent generating said tracking view was run and a date and time that said agent generating said tracking view was run.

18. The program storage device of claim 17, the method further including:
determining if new responses exist by comparing said temporal indication in said tracking view to a posting date or posting date and time of responses to said topics or of responses to said responses.

19. The program storage device of claim 17, wherein said new topics, said new responses, or both said new topics and said new responses are posted as soon as received by said forum.

20. The program storage device of claim 17, wherein said periodic emails contain the text of new responses or pointers to new responses on said forum.

21. The program storage device of claim 17, the method further including:
   presenting to each of said users who have elected to receive said periodic emails, a customized interest selection screen, said interest selection screen indicating for each of one or more forums, a forum name, an associated discussion topic and having an associated periodic email selection button.

22. The program storage device of claim 17, wherein said responses include responses to other responses.

23. The program storage device of claim 17, wherein said forum is accessible on the World Wide Web or a local area network.

24. The program storage device of claim 17, wherein said forum is implemented on a LOTUS NOTES™ database.

* * * * *